(12) United States Patent
Broghammer et al.

(10) Patent No.: US 10,481,892 B2
(45) Date of Patent: Nov. 19, 2019

(54) MULTIPLE DOMAIN EMBEDDED SYSTEM

(71) Applicant: Harman Becker Automotive Systems GmbH, Karlsbad (DE)

(72) Inventors: Markus Broghammer, Waldronn (DE); Dirk Fries, Straubenhardt (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 397 days.

(21) Appl. No.: 13/855,581

(22) Filed: Apr. 2, 2013

(65) Prior Publication Data

US 2013/0268923 A1 Oct. 10, 2013

(30) Foreign Application Priority Data

Apr. 4, 2012 (EP) ..................................... 12002467

(51) Int. Cl.
  *G06F 8/65* (2018.01)
  *G06F 11/14* (2006.01)
  *G06F 9/4401* (2018.01)

(52) U.S. Cl.
  CPC .............. *G06F 8/65* (2013.01); *G06F 9/4413* (2013.01); *G06F 11/1433* (2013.01)

(58) Field of Classification Search
  CPC ................................ G06F 8/65; G06F 9/4413
  USPC ......................................................... 717/168
  See application file for complete search history.

(56) References Cited

U.S. PATENT DOCUMENTS

| | | | |
|---|---|---|---|
| 6,026,478 A * | 2/2000 | Dowling | 712/24 |
| 6,934,956 B1 | 8/2005 | Allen | |
| 7,200,775 B1 * | 4/2007 | Rhea | G06F 11/2294 714/27 |
| 7,461,374 B1 * | 12/2008 | Balint et al. | 717/174 |
| 7,971,047 B1 * | 6/2011 | Vlaovic et al. | 713/1 |
| 8,270,963 B1 * | 9/2012 | Hart et al. | 455/418 |
| 2002/0100036 A1 * | 7/2002 | Moshir et al. | 717/173 |
| 2002/0138567 A1 * | 9/2002 | Ogawa | G06F 9/4411 709/203 |
| 2003/0037327 A1 * | 2/2003 | Cicciarelli et al. | 717/178 |
| 2004/0073912 A1 * | 4/2004 | Meza | 719/321 |

(Continued)

FOREIGN PATENT DOCUMENTS

CN 10227976 A 12/2011
WO WO 02/067483 A2 8/2002

OTHER PUBLICATIONS

European Search Report from corresponding European Patent Application No. EP 12002467.4, 8pgs., dated Jul. 4, 2012.

(Continued)

*Primary Examiner* — James D. Rutten
(74) *Attorney, Agent, or Firm* — Brooks Kushman P.C.

(57) ABSTRACT

A system for updating a multiple domain embedded system may include a processor that can identify a device associated with the embedded system and a driver that supports the device. The processor can determine a domain associated with the driver and a first configuration label of a first configuration of the multiple domain embedded system. The processor can also determine a second configuration label of a second configuration of the multiple domain embedded system, based on the first configuration label, an identification of the driver, and an identification of the device. Further, the processor can update the driver based on the second configuration label.

4 Claims, 3 Drawing Sheets

(56) References Cited

U.S. PATENT DOCUMENTS

| | | | |
|---|---|---|---|
| 2005/0054400 A1* | 3/2005 | Seick et al. | 455/575.9 |
| 2005/0132179 A1* | 6/2005 | Glaum et al. | 713/1 |
| 2005/0132350 A1* | 6/2005 | Markley et al. | 717/168 |
| 2007/0074197 A1* | 3/2007 | David Buckley | G06F 8/63 |
| | | | 717/168 |
| 2009/0089815 A1 | 4/2009 | Manczak et al. | |
| 2013/0297352 A1* | 11/2013 | Noe | G06Q 10/02 |
| | | | 705/4 |

OTHER PUBLICATIONS

Kenneth C. Rovers, Jan Kuper, Marcel D. van de Burgwal, André B.J. Kokkeler and Gerard J.M. Smit, Multi-domain transformational design flow for embedded systems, International Conference on Embedded Computer Systems: Architectures, Modeling and Simulation, IC-SAMOS 2011, Jul. 18-21, 2011, Samos, Greece, pp. 93-101. IEEE Computer Society. ISBN 978-1-4577-0802-2.

Susumu Tokumoto, 12.Product Line Development using Multiple Domain Specific Languages in Embedded Systems, Proceedings of the Third International Workshop on Model Based Architecting and Construction of Embedded Systems (ACES-MB-2010) held as part of the 2010 International Conference on Model Driven Engineering Languages and Systems (MoDELS'10), Oslo, Norway, Oct. 4, 2010, pp. 125-129.

Wikipedia, "Application domain", Mar. 14, 2013, 2 pages.

Wikipedia, "Embedded System", Oct. 8, 2013, 12 pages.

Chinese Office Action and English translation for corresponding Application No. 201310114558.8, dated Jul. 18, 2016, 10 pages.

* cited by examiner

MULTIPLE DOMAIN EMBEDDED SYSTEM

BACKGROUND OF THE INVENTION

1. Priority Claim

This application claims the benefit of priority from European Patent Application No. EP12002467.4, filed Apr. 4, 2012, which is incorporated by reference.

2. Technical Field

The present system relates to embedded systems for updating firmware. In particular, the present system relates to embedded systems with multiple domains. Further, the present system relates to updating multiple domain embedded systems.

3. Related Art

Firmware update mechanisms exist that check whether a firmware update is necessary, either regularly or when a new device is plugged in. A firmware update may include improvements, such as optimizations in a program execution speed or eliminating error within a certain firmware release.

Firmware may include hardware and/or software enabled functions and/or data structures that operate within electronic devices, such as remote controls, calculators, computer peripheral devices, scientific instrumentation, robots, mobile phones, digital cameras, and personal computers. Firmware can enable a device's basic operation as well as higher-level functions. Firmware is diverse, as most electronic devices contain firmware at more than one level. Even subsystems of an electronic device, such as central processing units (CPUs), flash chips, communication controllers, display modules, and so on, have their own program code and/or microcode, which may be considered firmware. Low-level firmware may reside in a programmable logic array (PLA) structure or in read-only memory (ROM), for example, while high-level firmware may include software or act as an interface to software.

Common reasons for updating firmware include fixing bugs or adding features to a device. Doing so may involve loading a binary file provided by a manufacturer of the device.

SUMMARY

Multiple domain embedded systems can update firmware. Systems that can update multiple domain embedded systems may include a processor that can identify a connected electronic device and one or more drivers that support the device. Such a processor may also identify and determine one or more domains associated with the driver(s) and a first configuration label of a first configuration of the multiple domain embedded system. The first configuration label may include a first list of first files that are associated with the one or more domains. The processor also can determine a second configuration label of a second configuration of the multiple domain embedded system, based on the first configuration label, an identification of the driver(s), and an identification of the device. The second configuration label may include a second list of second files that are associated with the one or more domains. The processor also can update the driver(s) based on the second files and the second file list.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
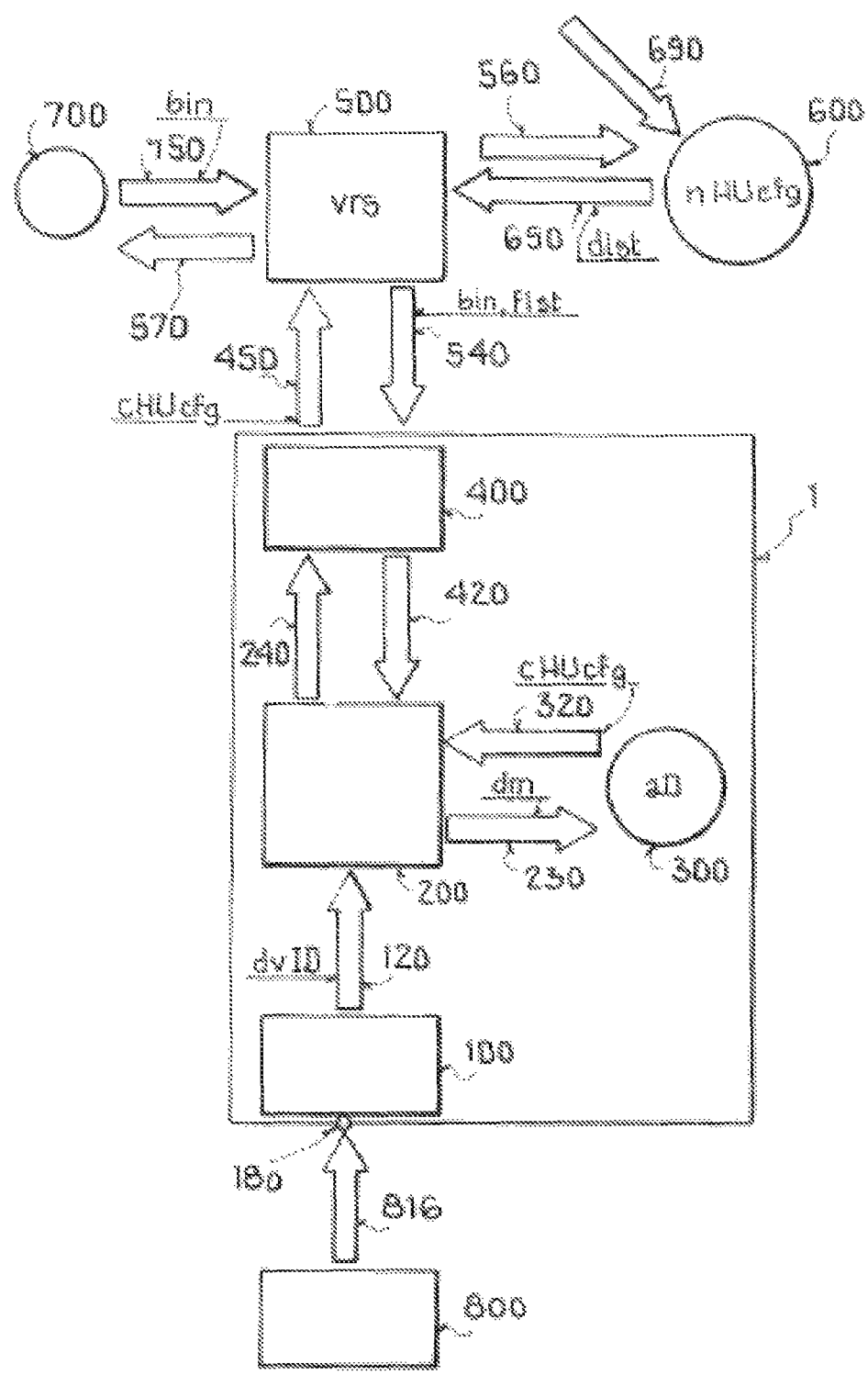
FIG. 1 illustrates an example block diagram including an example multiple domain embedded system for updating firmware.

It is to be understood that the following description of examples of implementations are given only for the purpose of illustration and are not to be taken in a limiting sense. The partitioning of examples in function blocks, modules or units illustrated in the drawings is not to be construed as indicating that these function blocks, modules or units are necessarily implemented as physically separate devices or a single physical device. Functional blocks, modules or units illustrated or described may be implemented as separate devices, circuits, chips, functions, modules, or circuit elements. One or more functional blocks, modules, or units may also be implemented in a common circuit, chip, circuit element or device.

Described herein, is a system for updating firmware, such as a multiple domain embedded system for updating firmware. Further described, is a system for updating such a multiple domain embedded system.

As an example, an identification of a device, such as a vehicle head unit, connected to an interface of the system may be ascertained. The system may be updated if the device is not supported by the system. A supporting driver name of a supporting driver that supports the device may also be ascertained. At least one affected domain may be ascertained, and the domain may include the supporting driver. A configuration label of a current configuration of the system may also be ascertained. The configuration label may include a domain file list of files that are associated with the affected domain. The configuration label, the supporting driver name, and the identification may be transferred to a configuration database.

A new configuration label of a new configuration of the system and a file list may be ascertained by the configuration database. The ascertainment may carry out based on the transferred configuration label, the transferred supporting driver name, and the transferred identification, as input variables. The file list may define files of drivers to be updated to migrate from the current configuration to the new configuration. Binary data of the files of the drivers, the file list, and the new configuration label are transferred to the system. The drivers are updated via binary data and the file list.

A minimal approach may be achieved by ascertaining the file list, so that the files of the drivers for the update may be transferred to the system. Since the drivers of an affected domain are updated, the drivers of unaffected domains remain unchanged. This limits errors during the update that may impair other functions of the system. This functionality is useful when updating a multiple domain embedded system.

A multiple domain embedded system may include an interface for connecting a device and for ascertaining an identification of the device connected to the interface. The system may be configured for updating firmware. The system may be configured to ascertain a supporting driver name of a supporting driver that supports the device. The system may be configured to ascertain at least one affected domain. The affected domain may include the supporting driver. The system may be configured to ascertain a configuration label of a current configuration of the system. The configuration label may include a domain file list of files that are associated with the affected domain. The system may also be configured to send the configuration label, the supporting driver name, and the identification to a configuration database.

The system may be configured to receive binary data of files of drivers to be updated. The system may be configured to receive a file list and a new configuration label. The binary data, the file list, and the new configuration label may be based on the transferred configuration label, the supporting driver name, and the identification. The file list may define the files of the drivers to be updated to migrate from the current configuration to the new configuration. The system may be configured to update the drivers by the binary data and the file list.

A domain of a multiple domain embedded system, such as a domain of a particular application, may be a mechanism used to isolate executed software or firmware applications from one another so that they do not affect each other. Each domain may include its own address space, such as a virtual address space, which references resources for the domain using that address space.

In one example, the configuration label, the supporting driver name, and the identification may be transferred to the configuration database via a network connection. The system may include an online module for a wired and/or a wireless connection. The configuration database may be advantageously disposed outside the system. The configuration database at a central location may be accessible from a number of systems. Also accessible, such as via a network connection or a local storage unit, may be the configuration label, the supporting driver name, and the identification.

A new configuration label may be ascertained via the configuration database. Mutual dependencies of the files of the domain may be evaluated and/or defined in a table of the database. The table may be a lookup table.

In one example, current binary data may be copied. Also, the current binary data may be overwritten by the transferred binary for updating. The current binary data may be a part of data of the system that is overwritten during the update process, and copying of the current binary data may be defined by the file list as well. After the copying, the current binary data may be overwritten by the transferred binary data. The copied current binary data may be buffered in a separate memory space. The buffered binary data may be written back if it is ascertained that the update may include failed. If the update is successful, the copied binary data is deleted. This allows for efficient rollback, since only the drivers on the driver list may be reset to the previous version.

In one example, the file list may be ascertained based on a driver list. The driver list may be ascertained via the configuration database based on the transferred configuration label, the transferred supporting driver name, and the transferred identification, as input variables. The driver list may include drivers to be updated to migrate from the current to the new configuration.

In one example, the driver list may include a subset of files of the affected domain. The set of files of the affected domain may be the superset. The system may be configured to ascertain a subset of files of the affected domain. In one example, a version may be ascertained for each driver contained in the driver list, based on resolving the driver dependencies of the drivers of the driver list. FIG. 1 illustrates an example block diagram including an example multiple domain embedded system for updating firmware. The blocks of the figure include a multiple domain embedded system 1. The multiple domain embedded system 1 may include multiple domains, such as ten domains. The domains may be used to isolate executed software or firmware applications from one another so that they do not affect each other. Each domain may include its own address space in a memory of the system. The multi-domain embedded system 1 is referred to hereinafter as system 1.

In the example embodiment in FIG. 1, system 1 may include a device manager 100 for detecting a device 800, an update manager 200 for driver management, a driver database 300, and an online module 400 for connecting and caching. A system with a long life cycle that benefits from frequent updates, such a vehicle information system, may include one or more aspects of system 1. System 1, as shown in FIG. 1, may be configured for software and/or firmware updates.

For example, once a new device, a new medium, or a new component has been inserted into an automotive system via an interface 180 (such as by the user or a service station), a check may be made of whether new drivers or software updates are desired or are available. This can be based on a local or online database 600 or a service provider via any protocol and medium.

In FIG. 1, an identification dvID of a device 800 connected to an interface 180 of the system 1 may be ascertained. A transfer 816 of data that characterizes the external device 800 is carried out from the device 800 to the device manager 100 of the system 1 via the interface 180. These new drivers or software updates are to be loaded or installed semi-automatically (such as by prompting the user) or fully automatically. If an incompatibility occurs, a corresponding message may be displayed. Parameters (such as vendor ID, device ID, serial number, firmware version, or software version) may be ascertained for an identification dvID of the new device 800 and taken into account during the update. This facilitates automatically detecting and installing drivers when the new device 800, medium, or component is detected in the automotive system 1. Even hardware changes are detectable (such as support for the detection of secure digital cards or USB). The operation may notify the end user to take his or her vehicle to the nearest service station for updating.

In the example illustrated in FIG. 1, the system 1 may be updated if the device 800 connected to the interface 180 is not supported by the system 1.

The system 1 may be configured to ascertain a supporting driver name drn of a supporting driver that supports the device 800. In the example illustrated in FIG. 1, the device manager 100 may be connected to the update manager 200 for this purpose, the device manager 100 transferring the identification dvID to the update manager 200 with the aid of transfer 120.

The system 1 may be configured to ascertain at least one affected domain aD. The affected domain aD may include the supporting driver. This may be facilitated by the update manager 200 being connected to the driver database 300 of the system 1 for transfer 230 of the supporting driver name drn. The driver database 300 may be configured to ascertain the affected domain based on the supporting driver name drn. For example, driver names associated with one domain are stored in table form, so that a name in the table can be compared with the supporting driver name drn. In a case where the table contains the supporting driver name drn, the domain aD may be affected.

The system 1 may be configured to ascertain a configuration label cHUcfg of a current configuration of the system 1 that is associated with affected domain aD. The driver database 300 may be configured to generate or read out the configuration label cHUcfg of the current configuration. The configuration label cHUcfg may include a domain file list of files that belong to one or more affected domains aD. The configuration label cHUcfg may communicate with the update manager 200 with the aid of transfer 320.

The system 1 may be configured to send the configuration label cHUcfg of the current configuration, the supporting driver name drn, and the identification dvID of the device 800 to a configuration database 600. The configuration database 600 may be external to the system 1. The configuration database 600 may be configured to evaluate necessary data for updating depending on the configuration label cHUcfg, the supporting driver name drn, and the identification dvID input. In the example illustrated in FIG. 1, an online portal 500 for a network connection is also provided. In the system 1, the update manager 200 is connected to the online module 400. Via a network (not illustrated), the configuration label cHUcfg may be transferred from the update manager 200 to the online module 400 with the aid of a transfer 240 and from the online module 400 to the online portal 500 with the aid of another transfer 450.

The system 1 may be configured to receive binary data bin of the files of a file list flst for driver files and also to receive a new configuration label nHUcfg. To retrieve binary data bin at a later point, the online portal 500 transfers the current configuration label cHUcfg together with the driver name drn and the identification dvID to the configuration database 600 with the aid of transfer 560 for the purpose of ascertaining the new configuration label nHUcfg. The current configuration label cHUcfg together with the driver name drn and the identification dvID to the configuration database 600 may be transferred back to the online portal 500 together with a driver list dlst with the aid of transfer 650. The configuration database 600 may also be referred to as head unit configuration database 600. With the aid of corresponding programming 690 by an administration, dependencies that are evaluated to select the correct files containing binary data bin are stored in the head unit configuration database 600. The dependencies are stored, for example, in a dependency table. The file names of the ascertained files may be specified in file list flst, and version information vrs of the drivers may be ascertained by the online portal 500. If the file names and version information vrs of each driver is recorded in driver list dlst, an associated binary data bin may be read from a driver data repository 700 with the aid of query 570 and made available to the online portal 500 with the aid of transfer 750. Binary data bin, a file list flst, and the new configuration label nHUcfg may be based on the transferred configuration label cHUcfg, the driver name drn, and the identification dvID. The file list flst may define files of drivers to be updated to migrate from the current configuration to the new configuration. Driver list dlst may define the drivers for the update as well as their version information vrs to migrate from the current configuration to the new configuration. Where binary data bin and the file list flst have been transferred to the system 1 using transfer 540, the system 1 may be configured to update the drivers with the aid of binary data bin of the driver files and the file list flst.

Given the example system illustrated in FIG. 1, it may be imaginable to adapt the system 1 in smaller incremental operations to follow the changes in the media landscape. New devices, new media, or new modules may be supported by the system 1, and the system may check itself as to whether the support is ruled out by dependencies or incompatibilities.

Figure 2:
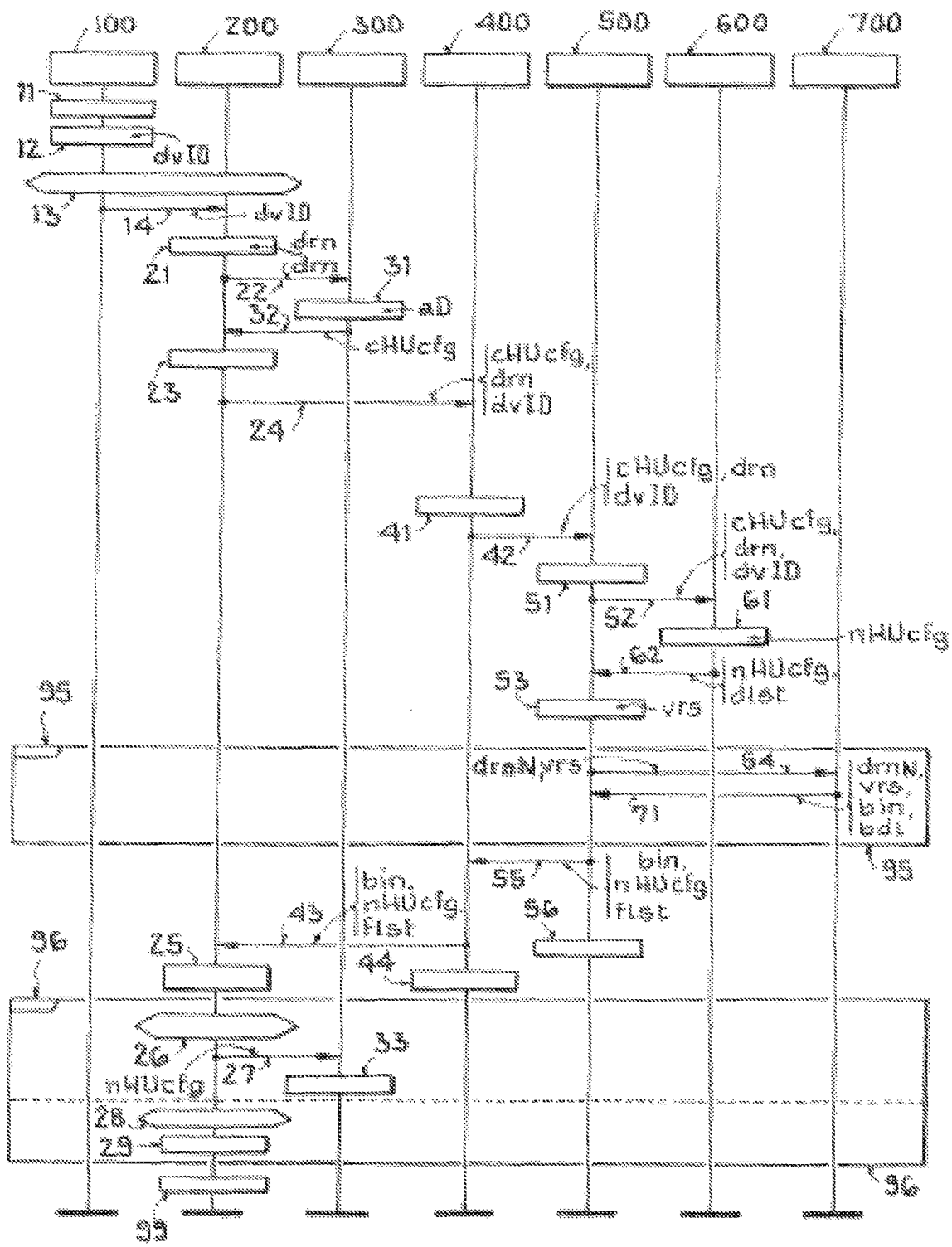
FIG. 2 illustrates an example operation including example processes performed by example aspects of the multiple domain embedded system of FIG. 1.

The device manager 100, update manager 200, driver database 300, online module 400, online portal 500, head unit configuration database 600, and driver repository 700 are depicted with respect to their role in an example operation illustrated in FIG. 2. The example operation depicts the updating of firmware that may be facilitated by system 1 when a previously unsupported device 800 is connected to an interface of the system (such as interface 180 in FIG. 1).

At process 11, the device 800 is connected to the system 1, and the device 800 may a USB device. Also, an interface of the system 1 may include a USB interface, an advanced technology attachment (ATA) interface, or a card interface, for example.

An identification dvID of the connected device 800 may be ascertained at process 12. The identification dvID may include, for example, a device number, a type designation, and/or a vendor ID. The identification dvID may include parameters that are necessary to ascertain a driver version of a driver that is compatible with the device 800.

At process 13, the system 1 may detect that the device 800 is not supported.

At process 14, the device manager 100 may notify the update manager 200 of the unsupported device 800 by transferring the identification dvID to the update manager 200.

At operation 21, the update manager 200 may ascertain the driver name drn of a driver that supports the device 800. The update manager 200 may identify the driver and the driver name drn to support the device 800, such as a USB driver. The driver may include the same driver name drn before and after the update. The driver version may differ.

A configuration label cHUcfg of a current configuration may be ascertained with the aid of the driver database 300, and the update manager 200 may send the driver name drn to the driver database 300 at operation 22.

At operation 31, one or more affected domains aD may be ascertained with the aid of the driver database 300. Each affected domain aD may include the supporting driver. The affected domain aD may also include additional drivers, a list of driver names, and a determined status based on the driver names of the particular domain. Domain aD may include a dependency tree that may define the relationship between the files, such as the binary files that may be compatible with each other in each case, on the basis of file versions. In one example, only one domain aD is affected. In other examples, multiple domains aD are affected.

Also, at operation 31, a configuration label cHUcfg of a current configuration of the system 1 that is associated with one or more affected domains aD may be ascertained, and transferred to the update manager 200 at operation 32. The configuration label cHUcfg may define at least one file list of files that may be associated with the affected domain aD, such as an affected executable file. An executable file may be an .exe, .dll, .sys, or .drv file, for example. The configuration label cHUcfg may form a data structure for the domains and may include version identifications, such as a current file version of a particular file.

An update session may be generated at operation 23. The update session may occur via an internal system session that handles actions of a current update process. In the example illustrated in FIG. 2, the configuration label cHUcfg, the driver name drn, and the identification dvID may be transferred to the online module 400 in the update session, which occurs at operation 24.

At operation 41, an online connection may be made from the online module 400 to the online portal 500. If a connection has been established, operation 41 may be skipped. In the example illustrated in FIG. 2, a connection may occur at any time if the online module 400 uses, for example, the TCP/IP protocol over a wireless connection, such as with the aid of UMTS or WLAN. Alternatively, a device connected between the online module 400 and the online portal 500 may be provided to establish the connection to the online portal 500 and to accept and/or transfer data from and to the system 1. For example, the device may include a USB capability.

The configuration label cHUcfg, the driver name drn, and the identification dvID may be transferred to the online portal 500 in further operation 42. In addition, an updated session identification may be transferred from the online module 400 to the online portal 500. A session for the update operation may also be created in the online portal 500, which may occur at operation 51.

At operation 52, the configuration label cHUcfg, the driver name drn, the identification dvID, and/or the update session identification may be transferred from the online portal 500 to the head unit configuration database 600. At operation 61, a new configuration label nHUcfg may be ascertained with the aid of the head unit configuration database 600. Which new configuration to be used to fulfill a proper update of the affected driver may be determined. The new configuration label nHUcfg may contain configuration data of the new configuration of the system 1 after an update.

Associated with the new configuration label nHUcfg, a driver list dlst may also be ascertained with the aid of configuration database 600 based on the transferred configuration label cHUcfg of the current configuration and based on the driver name drn and the identification dvID of the device 800 as input variables. The new configuration label nHUcfg may be ascertained by evaluating the files of the affected domain aD. For example, an associated entry in a lookup table may be read out. The driver list dlst may define the driver names of drivers for a firmware update.

At operation 62, the driver list dlst, the new configuration label nHUcfg, and/or an identification of a respective session may be transferred from the configuration database 600 to the online portal 500. At operation 53, mutual dependencies of the drivers listed on the driver list dlst may be resolved at the online portal 500, and the desired versions of the drivers may be ascertained and added to the driver list dlst as version information vrs. The version information vrs of the drivers to migrate from the current configuration to the new configuration may be ascertained. The mutual dependencies of the drivers may not be known to the system 1, so the dependencies, such as the dependencies of an external device, may be ascertained by the online portal 500 in the example illustrated in FIG. 2.

The files associated with the driver list dlst may be a subset of drivers of the affected domain aD. Alternatively, drivers having the same version are not transferred for the firmware update and, if applicable, the files associated with the drivers that are not included in the system 1 may be transferred. The volume of the data to be transferred for updating the system 1 may be reduced by this efficiency.

At operation 95, operations 54 and 71 may be repeated for one or more drivers on the driver list dlst. At operation 54, driver name drnN and version information vrs may be transferred for each driver to be updated from the online portal 500 to the driver data repository 700. At operation 95, driver data repository 700 may return a binary data list bdl, binary data bin, the driver name drnN, and version information vrs for one or more drivers on driver list dlst.

At operation 55, files of drivers to be updated are listed in a file list flst. The files may include binary data bin. At operation 56, the file list flst may define files of the drivers to be updated and migrated from the current configuration to the new configuration. The file list and the new configuration label nHUcfg may be transferred to the system 1 over a connection between the online portal 500 and the online module 400 of the system 1. In the example illustrated in FIG. 2, a session identification may be transferred as well. The session identification may be a unique identifier of the update process. The file list flst may contain the files of drivers for updating within a session. The new configuration label nHUcfg may include the names drnN of drivers to be updated including the corresponding version information vrs.

In the example illustrated in FIG. 2, the binary data bin of the driver files of the drivers of the driver list dlst, the new configuration label nHUcfg, and the file list flst and, if applicable, the session identification are transferred from the online module 400 to the update manager 200 at operation 43. At operation 44, the connection between the online module 400 and the online portal 500 may be cleared. The connection may also remain established for further functions and services in which case operation 44 may be skipped.

The update operation may start at operation 25. The drivers may be updated according to file list flst according to the binary data bin of the driver files.

A result of the update operation is illustrated schematically as an operation 96 in FIG. 2. The update operation may be established at operation 26, so that operation 27 is carried out. At operation 27, the new configuration label nHUcfg may be transferred to the driver database 300 of system 1 and stored therein at operation 33.

Alternatively, the update operation may fail, which may be ascertained at operation 28. Previous versions of the files affected, which are modified by the binary data bin in the update process, may be copied and buffered in a memory of the update manager 200 before being overwritten. This may not occur in the case of a full firmware update. For example, the system 1 may no longer be operational after a failed update process. Where one domain is affected or two domains are affected, the remaining domains may remain operational without changes.

A version rollback may occur at operation 29, where previous versions of the affected files of the update operation overwrite new binary date bin and rebuild the system 1 to a previous configuration of the system 1. At operation 99, the update session may be terminated.

Figure 3:
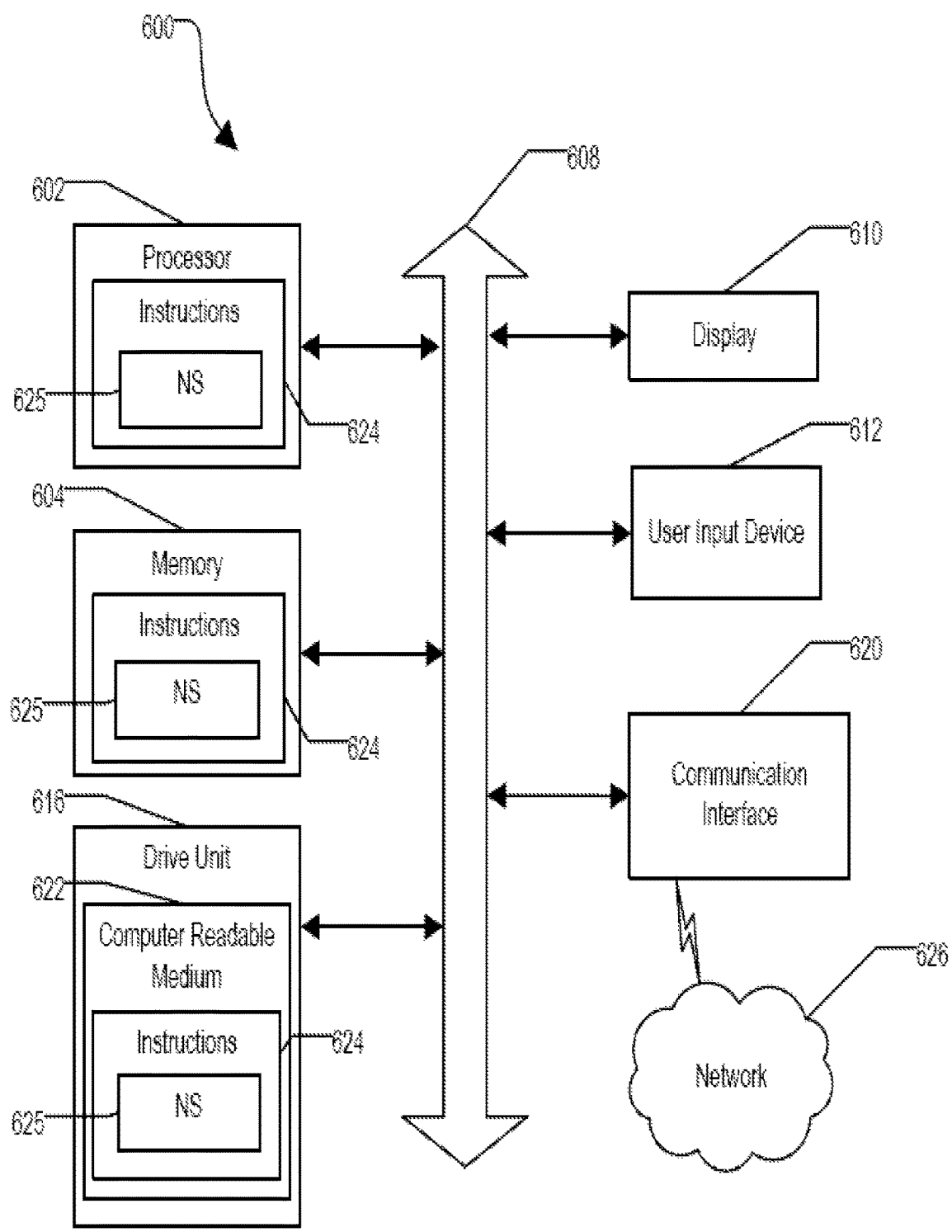
FIG. 3 illustrates an example block diagram of an example computer system that may be included or used with one or more aspects of the multiple domain embedded system of FIG. 1.

Furthermore, the system, one or more aspects of the system, or any other device or system operating in conjunction with the system may include a portion or all of one or more computing devices of various kinds, such as the computer system 3000 in FIG. 3. The computer system 3000 may include a set of instructions that can be executed to cause the computer system 3000 to perform any one or more of the operations or computer based functions disclosed herein. The computer system 3000 may operate as a stand-alone device or may be connected, such as, using a network, to other computer systems or peripheral devices.

The computer system 3000 may be implemented using electronic devices that provide voice, audio, video or data communication. While a single computer system 3000 is illustrated, the term "system" may include any collection of systems or sub-systems that individually or jointly execute a set, or multiple sets, of instructions to perform one or more computer functions.

The computer system 3000 may include a processor 3002, such as a central processing unit (CPU). The processor 3002 may be a component in a variety of systems. The processor 3002 may be one or more general processors, digital signal processors, application specific integrated circuits, field programmable gate arrays, servers, networks, digital circuits, analog circuits, combinations thereof, or other now known or later developed devices for analyzing and processing data. The processor 3002 may implement a software program, such as code generated manually or programmed.

The term "module" may be defined to include a plurality of executable modules. The modules may include software, hardware, firmware, or some combination thereof executable by a processor, such as processor 3002. Software modules may include instructions stored in memory, such as memory 3004, or another memory device, that may be executable by the processor 3002 or other processor. Hardware modules may include various devices, components, circuits, gates, circuit boards, and the like that are executable, directed, or controlled for performance by the processor 3002.

The computer system 3000 may include a memory 3004, such as a memory 3004 that can communicate via a bus 3008. The memory 3004 may be a main memory, a static memory, or a dynamic memory. The memory 3004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 3004 includes a cache or random access memory for the processor 3002. In alternative examples, the memory 3004 may be separate from the processor 3002, such as a cache memory of a processor, the system memory, or other memory. The memory 3004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 3004 is operable to store instructions executable by the processor 3002. The functions, acts or tasks illustrated in the figures or described may be performed by the programmed processor 3002 executing the instructions stored in the memory 3004. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The computer system 3000 may be in communication with, may include, or may not further include a display device 3010, such as a liquid crystal display (LCD), an organic light emitting diode (OLED), a flat panel display, a solid state display, a cathode ray tube (CRT), a projector, a printer or other now known or later developed display device for outputting determined information. The display 3010 may act as an interface for the user to see the functioning of the processor 3002, or specifically as an interface with the software stored in the memory 3004 or in the drive device 3016.

The computer system 3000 may include an input device 3012 configured to allow a user to interact with any of the components of computer system. The input device 3012 may be a keypad, a keyboard, or a cursor control device, such as a mouse, or a joystick, touch screen display, remote control or any other device operative to interact with the computer system 3000. For example, a user of a navigation system may input criteria or conditions to be considered by a navigation device in calculating a route using the input device 3012.

The computer system 3000 may include a disk or optical drive device 3016. The disk drive device 3016 may include a computer-readable medium 3022 in which one or more sets of instructions 3024 or software can be embedded. The instructions 3024 may embody one or more of the methods or logic described herein, including aspects of the system 3025. The instructions 3024 may reside completely, or partially, within the memory 3004 or within the processor 3002 during execution by the computer system 3000. The memory 3004 and the processor 3002 also may include computer-readable media as discussed above.

The computer system 3000 may include computer-readable medium that includes instructions 3024 or receives and executes instructions 3024 responsive to a propagated signal so that a device connected to a network 3026 can communicate voice, video, audio, images or any other data over the network 3026. The instructions 3024 may be transmitted or received over the network 3026 via a communication port or interface 3020, or using a bus 3008. The communication port or interface 3020 may be a part of the processor 3002 or may be a separate component. The communication port 3020 may be created in software or may be a physical connection in hardware. The communication port 3020 may be configured to connect with a network 3026, external media, the display 3010, or any other components in the computer system 3000, or combinations thereof.

The term "computer-readable medium" may include a single storage medium or multiple storage media, such as a centralized or distributed database, or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In alternative examples, dedicated hardware implementations, such as application specific integrated circuits, programmable logic arrays and other hardware devices, may be constructed to implement various aspects of the system. One or more examples described may implement functions using two or more specific interconnected hardware modules or devices with related control and data signals that can be communicated between and through modules, or as portions of an application-specific integrated circuit. The system may encompass software, firmware, and hardware implementations.

The system described may be implemented by software programs executable by a computer system. Implementations can include distributed processing, component/object distributed processing, and parallel processing. Alternatively, virtual computer system processing can be constructed to implement various aspects of the system.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for updating a multiple domain embedded system, each domain configured for isolating executed applications from one another so that they do not affect each other, the system comprising:
    a processor configured to operate in an automotive system; and
    memory communicatively coupled to the processor, the memory including:
        instructions executable by the processor to identify an electronic device associated with the multiple domain embedded system;
        instructions executable by the processor to identify a driver that supports the electronic device;
        instructions executable by the processor to determine at least one domain associated with the driver;
        instructions executable by the processor to determine a first configuration label of a first configuration of the multiple domain embedded system, the first configuration label including a first list of first files that are associated with the at least one domain;
        instructions executable by the processor to transmit the first configuration label, an identification of the driver, and an identification of the electronic device to a configuration database, wherein the identification of the electronic device includes a device number, a type designation, and a vendor ID;
        instructions executable by the processor to receive, from the configuration database, a second configuration label of a second configuration of the multiple domain embedded system, and a session identification as a unique identifier for updating firmware, where the second configuration label includes a second list of second files that are associated with the at least one domain; and
        instructions executable by the processor to update the driver based on the second files and the second file list,
        where in response to detection by the processor of failure of the update of the driver, the processor further configured to roll back the driver based on the first files and the first file list and overwriting the second files with the respective first files; and
    a display configured to display a message notifying a user of an incompatibility of the second files and the at least one domain.

2. The system according to claim 1, wherein the system is configured to notify a user to update at a service station.

3. A method for updating a multiple domain embedded system, each domain configured for isolating executed applications from one another so that they do not affect each other, the method comprising:
    identifying, by a first processor in an automotive system and the first processor being associated with a configuration manager, an electronic device associated with the multiple domain embedded system;
    identifying, by the first processor, a driver that supports the electronic device;
    determining, by the first processor, at least one domain associated with the driver;
    determining, by the first processor, a first configuration label of a first configuration of the multiple domain embedded system, the first configuration label including a first list of first files that are associated with the at least one domain;
    communicating, by the first processor, the first configuration label, an identification of the driver, and an identification of the electronic device to a second processor associated with a configuration database, wherein the identification of the electronic device includes a device number, a type designation, and a vendor ID;
    determining, by the second processor, a second configuration label of a second configuration of the multiple domain embedded system, based on the first configuration label, the identification of the driver, and the identification of the electronic device, and where the second configuration label includes a second list of second files that are associated with the at least one domain; and
    communicating, by the second processor, a session identification as a unique identifier for updating firmware, the second files and the second configuration label to the first processor;
    updating, by the first processor, the driver based on the second files and the second file list;

determining with the first processor that the update has failed, and the first processor rolling back the driver based on the first files and the first file list and overwriting the second files with respective first files; and displaying a message notifying a user of an incompatibility of the second files and the at least one domain.

4. The method of claim 3, further comprising notifying a user to update at a service station.

\* \* \* \* \*